Patented Aug. 11, 1931

1,818,190

UNITED STATES PATENT OFFICE

JAMES ELIOT BOOGE, OF HILLSIDE, NEW JERSEY, ASSIGNOR, BY MESNE ASSIGNMENTS, TO THE GRASSELLI CHEMICAL COMPANY, A CORPORATION OF DELAWARE

LITHOPONE AND METHOD OF PREPARING SAME

No Drawing.    Application filed September 3, 1927.  Serial No. 217,531.

This invention relates to an improvement in lithopone manufacture and more particularly to production of a lithopone containing a predetermined amount of basic zinc compounds.

Lithopone as ordinarily produced is approximately an equimolecular mixture of zinc sulphide and barium sulphate. In practice the zinc sulphide content falls slightly lower or around 28.5% as compared with theoretical 29.4. Barium sulphate makes up most of the remaining percentage but there are present also variable amounts of zinc oxide and such impurities as water soluble salts, moisture, etc.

It is customary to use in lithopone manufacture solutions of zinc sulphate and barium sulphide produced by methods well known in the prior art. These are mixed with agitation, the end point corresponding to a very slight excess of zinc sulphate solution. This raw pigment is filtered, dried and calcined by methods known to those familiar with the art.

The zinc oxide content of the pigment is subject to wide variation. Lithopones will be found on the market which contain from less than .1% of zinc oxide to 2% or more. By zinc oxide is meant any basic zinc compounds which are extracted by 5% acetic acid. This variation is due to the raw materials used which show greater or less basicity and to the methods of calcination where more or less oxidation occurs.

This invention has as an object production of lithopone with control of the content of basic zinc compounds. A further object is treatment of lithopone to impart rapid drying properties to paints made therefrom. Other objects will appear hereinafter.

These objects are accomplished by treating calcined lithopone at some step in the process, preferably after the wet grinding, with a solution of zinc salt in predetermined amount. The zinc is then precipitated in the pigment as a basic zinc compound by the addition of an alkaline precipitant.

Any lithopone process of the prior art may be followed up to and including the calcination and quenching steps.

At this point the quenched pigment may be acid treated, if desired, to dissolve out the zinc oxide formed during the calcination step. Such acid treatment should preferably be made following the wet grinding. The detailed process will be found in U. S. Patents #1619376 and #1540456. It will be understood that this acid treatment step is not part of the present invention and that it may be omitted, if the calcined pigment runs low in zinc oxide.

The next step comprises treatment of the pigment at some step following the quenching, and preferably after the wet grinding, with a soluble zinc salt. The latter may be in the form of ordinary zinc sulphate solution used as a lithopone raw material. This zinc solution is added in a predetermined amount necessary to give the finished lithopone the desired content of basic zinc compounds. The usual range is from .3 to 1% of basic zinc compounds determined as acetic acid soluble zinc and calculated as percentage of zinc oxide based on the pigment. After complete mixing of the zinc solution with the pigment slurry, there is added a solution of an alkaline zinc precipitant such as sodium carbonate. The addition is continued until all of the zinc is precipitated or until a definite pH is reached, usually in the range of 7–7.5

The pigment is then ready for the usual bluing with ultramarine blue, followed by filtration, drying and distintegration in the usual manner.

As a specific example, I may cite the following: A quenched pigment containing 1% of zinc oxide is to be treated. This quenched pigment slurry is passed through a tube mill and thence to a hydro-separator where the finely ground fraction is floated off. The coarse residue is recirculated through the tube mill until it likewise passes over the hydro-separator. This fine lithopone slurry is then treated with sulphuric acid to a pH of 3.5. In the next step, the treated slurry which will run twenty parts of water to one part of lithopone is settled in a Dorr thickener, where 90% of the supernatant liquor is removed and the resultant slurry containing two parts of water to one part of lithopone is ready for treatment. The remaining acid solution wetting the pigment contains the equivalent of .1% of zinc oxide. To this slurry is added an amount of zinc sulphate solution equivalent to .4% zinc oxide based on the pigment, bringing the total to .5% zinc oxide. To the mixture is then added sodium carbonate solution, the agitation being continued. Soda ash is added until the pH has reached 7.5 which gives a blue color with brom-thymol blue indicator. At this point no appreciable amount of zinc remains in the solution and the lithopone is now ready for bluing, filtration and drying. The finished product will be found to have a zinc oxide content very close to .5% and a reaction of approximately 12 cc. This reaction is determined by the method described in U. S. Patent No. 1,446,637.

Second example: A quenched pigment is available with .7% zinc oxide. This is wet ground, passed through the hydro-separator and acid treated as before. In this case, however, the dissolved zinc sulphate is not removed, but soda ash is immediately added to reprecipitate the zinc. The end point is controlled to completely precipitate the dissolved zinc. Addition of soda ash is continued until a sample of the slurry after filtration shows no test for zinc with potassium ferrocyanide. The resultant product will be found to contain very close to .7% zinc oxide but will show a reaction of somewhat below 10 by the method already referred to.

The process described above may be modified to control the basic zinc compounds at a lower figure if desired. For example, a pH of 7.2 may be chosen as the end point under which conditions approximately $\frac{2}{3}$ zinc will be precipitated. The pH limits run from 6.5 at which only a small fraction of zinc is removed from the slurry up to 7.5 at which the precipitation is complete. Similarly the reaction of the finished pigment will vary from 1 cc. to 15 cc. by the test referred to, depending on the end point chosen.

The zinc precipitate is probably normal zinc carbonate although basic zinc carbonate may be present as well. Sodium hydroxide or other alkaline solution may also be used as the precipitant. It will be understood that all of the figures given above refer to acetic acid soluble zinc calculated as zinc oxide. These basic zinc compounds are found by extraction with 5% acetic acid on the steam bath and the determination of the dissolved zinc.

The lithopones on the market show variable drying properties in paints. This is particularly true with vehicles of the treated oil type which are widely used. Paint manufacturers prefer to use linseed oil containing little or no China wood oil. This is due partly to the greater cost of the China wood oil, but more to the serious yellowing tendency of the latter oil. This yellowing tendency is shown by discoloration of white inside paints and enamels which are not exposed to direct light. It is one of the most serious disadvantages of inside paints. Likewise, the drier content of the paint has a large influence on yellowing. In general, the more drier used the greater the tendency to discolor. From the above considerations the best paint formula for yellowing will have comparatively poor drying properties. An example of such a formula follows:

|  | Per cent |
|---|---|
| Lithopone | 62.8 |
| Ground barytes | 13.1 |
| Bodied oil | 11.0 |
| Mineral thinner | 13.1 |
|  | 100.0 |

The ordinary lithopone on the market when ground in the above formula will require from six to eighteen hours or more to dry tack free. After over-night drying the films are quite soft and in some cases actually tacky. This is entirely overcome by the special treatment described above. A lithopone containing .5% of basic zinc compounds calculated as zinc oxide with a reaction of 10-15 cc. is quite tack free in two hours and the film will be hard after over-night drying. Further a lithopone containing 1% of zinc oxide in the form of basic zinc compounds and with a similar reaction will dry tack free within one hour and will be very hard after over-night drying.

This enormous difference in the drying is of great importance in general painting work. It is naturally desired to have a dry surface the next day. Moreover, the master painter wishes to apply at least one coat per day, and this cannot be done with the best results if the under-coat is still soft and somewhat tacky. These troubles are eliminated by the use of the special process described herein. It may be noted also that the mere presence of zinc oxide as in some prior art lithopones does not seem to impart superior drying properties. Evidently, the basic zinc compounds here covered together with the reaction obtained are necessary for great acceleration in the drying time.

I claim:

1. In the manufacture of lithopone, the step of imparting to the lithopone the property of producing a quick-drying paint when mixed with a vehicle such as bodied oil and the like, which comprises adding to the calcined lithopone a sufficient amount of a zinc solution to bring the total amount of basic zinc compounds of the finished lithopone, calculated as zinc oxide, up to a predetermined figure, and thereafter precipitating the zinc as a basic zinc compound by the addition of a basic substance in such quantity that the final product, when subjected to a precision alkalinity test with methyl orange as an indicator, requires from 1 to 15 cubic centimeters of N/50 sulphuric acid for titration to a faint pink color of 100 cubic centimeters of a clear filtrate obtained from a mixture of a 50 gram sample of said final product with 250 cubic centimeters of distilled water agitated for 5 minutes at a temperature between 65-75° F.

2. In the manufacture of lithopone, the step of imparting to the lithopone the property of producing a quick-drying paint when mixed with a vehicle such as bodied oil and the like, which comprises dissolving and removing all but about .1% of the zinc oxide of a zinc oxide-containing lithopone by treatment with sulphuric acid, adding to said lithopone a zinc sulphate solution in an amount sufficient to bring the total zinc content of said lithopone, calculated as acetic acid soluble zinc oxide, up to a predetermined amount, and thereafter precipitating the zinc as a basic zinc compound by the addition of sodium carbonate in such quantity that the final product, when subjected to a precision alkalinity test with methyl orange as an indicator, requires from 1-15 cubic centimeters of N/50 sulphuric acid for titration to a faint pink color of 100 cubic centimeters of a clear filtrate obtained from a mixture of a 50 gram sample of said final product with 250 cubic centimeters of distilled water agitated for 5 minutes at a temperature between 65-75° F.

In testimony whereof I affix my signature.

JAMES ELIOT BOOGE.